US008990327B2

(12) United States Patent
Drews et al.

(10) Patent No.: US 8,990,327 B2
(45) Date of Patent: Mar. 24, 2015

(54) LOCATION ESTIMATION OF SOCIAL NETWORK USERS

(75) Inventors: Clemens Drews, San Jose, CA (US); Jalal U. Mahmud, San Jose, CA (US); Jeffrey W. Nichols, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 13/487,855

(22) Filed: Jun. 4, 2012

(65) Prior Publication Data

US 2013/0325975 A1    Dec. 5, 2013

(51) Int. Cl.
| | |
|---|---|
| G06F 15/16 | (2006.01) |
| G06F 17/30 | (2006.01) |
| H04L 29/08 | (2006.01) |
| G06Q 10/10 | (2012.01) |
| G06Q 50/00 | (2012.01) |

(52) U.S. Cl.
CPC ............... *G06F 17/30* (2013.01); *H04L 67/22* (2013.01); *G06Q 10/10* (2013.01); *G06Q 50/01* (2013.01); *H04L 67/18* (2013.01)
USPC .......................................... 709/206; 707/778

(58) Field of Classification Search
CPC ................................. G06F 17/30; G06F 15/16
USPC ....................................................... 709/206
See application file for complete search history.

(56) References Cited

U.S. PATENT DOCUMENTS

| | | | | |
|---|---|---|---|---|
| 8,099,109 | B2 * | 1/2012 | Altman et al. | 455/456.3 |
| 8,326,327 | B2 * | 12/2012 | Hymel et al. | 455/456.3 |
| 8,660,793 | B2 * | 2/2014 | Ngo et al. | 701/520 |
| 8,682,350 | B2 * | 3/2014 | Altman et al. | 455/456.3 |
| 2004/0078367 | A1 * | 4/2004 | Anderson et al. | 707/3 |
| 2006/0252438 | A1 * | 11/2006 | Ansamaa et al. | 455/503 |
| 2007/0281690 | A1 * | 12/2007 | Altman et al. | 455/435.1 |
| 2008/0168033 | A1 | 7/2008 | Ott et al. | |
| 2011/0010205 | A1 | 1/2011 | Richards | |
| 2011/0029512 | A1 | 2/2011 | Folgner et al. | |
| 2011/0083101 | A1 | 4/2011 | Sharon et al. | |
| 2011/0119133 | A1 * | 5/2011 | Igelman et al. | 705/14.58 |
| 2011/0137881 | A1 | 6/2011 | Cheng et al. | |

(Continued)

OTHER PUBLICATIONS

Cheng, Z., et al., "You Are Where You Tweet: A Content-Based Approach to Geo-Locating Twitter Users," CIKM'10, Oct. 26-30, 2010, Toronto, Ontario, Canada, Copyright 2010, ACM 978-1-4503-0099-5/10/10.

(Continued)

*Primary Examiner* — Joseph E Avellino
*Assistant Examiner* — Binod J Kunwar
(74) *Attorney, Agent, or Firm* — Fleit Gibbons Gutman Bongini & Bianco PL; Thomas Grzesik

(57) ABSTRACT

Various embodiments of the invention relate to estimating the location of social network users. In one embodiment, a plurality of social media messages generated by a given user is received. A plurality of location features is extracted from the social media messages. Each of the location features is processed with at least one classifier from an ensemble of classifiers. A location classification is generated by each of the classifiers for each of the social media messages. Each classification comprises a location and a weight associated with that location. One of the locations is selected from the location classifications as the location of the given user based on a combination of the weights of the location classifications.

12 Claims, 11 Drawing Sheets

(56) References Cited

U.S. PATENT DOCUMENTS

| | | | |
|---|---|---|---|
| 2011/0159890 A1 | 6/2011 | Fortescue et al. | |
| 2011/0215966 A1 | 9/2011 | Kim et al. | |
| 2011/0238763 A1 | 9/2011 | Shin et al. | |
| 2011/0282799 A1 | 11/2011 | Huston | |
| 2012/0124458 A1* | 5/2012 | Cruzada | 715/205 |
| 2012/0172062 A1* | 7/2012 | Altman et al. | 455/457 |
| 2013/0086072 A1* | 4/2013 | Peng et al. | 707/743 |
| 2013/0191198 A1* | 7/2013 | Carlson et al. | 705/14.23 |
| 2013/0218965 A1* | 8/2013 | Abrol et al. | 709/204 |

OTHER PUBLICATIONS

Hecht, B., et al. "Tweets from Justin Bieber's Heart: The Dynamics of the "Location" Field in User Profiles", In Proc. of CHI, May 7-12, 2011, Vancouver, BC, Canada, Copyright 2011, ACM 978-1-4503-0267-08/11/05.

Eisenstein, J., et al., "A Latent Variable Model for Geographic Lexical Variation", In Proc. of EMNLP 2010, pp. 1277-1287, MIT Massachusetts, USA Oct. 9-11, 2010. Copyright 2010, Association for Computational Linguistics.

Bryant, Martin, http://thenextweb.com/2010/01/15/Twitter-geofail-023-tweets-geotagged/; Jan. 15, 2010, last visited on Jun. 4 2012, Copyright 2012 The Next Web.

FourSquare API, https://developer.foursquare.com/, Copyright 2012, last visited on Jun. 4, 2012, New York City, New York and San Francisco, California.

Twitter, http://dev.twitter.com/pages/streaming_api, May 15, 2012, last visited on Jun. 4, 2012, Copyright 2012.

Twitter, https://dev.Twitter.com/docs/api, last visited on Jun. 4, 2012, Copyright 2012.

http://opennlp.sourceforge.net/projects.html, Sep. 23, 2010, last visited on Jun. 4 2012, Copyright 2010, The Apache Software Foundation.

Hall, M., et al., http://www.cs.waikato.ac.nz/ml/weka/, last visited on Jun. 4 2012, Copyright 2009; The WEKA Data Mining Software: An Update; SIGKDD Explorations, vol. 11, Issue 1.

Amitay, E, et al. "Web-a-Where: Geotagging Web content", In Proc. of SIGIR, 04, Jul. 25-29, 2004, Sheffield, South Yorkshire, UK, Copyright 2004 ACM 1-58113-881-4/04/0007.

Backstrom, L., et al., "Find Me If You Can: Improving Geographical Prediction with Social and Spatial Proximity", In Proc. of WWW '10, Apr. 26-30, 2010, Raleigh, NC, USA, ACM 978-1-60558-799-8/10/04.

Chang, J. & Sun, E. "Location3: How Users Share and Respond to Location-Based Data on Social Networking Sites", In Proc. of ICWSM 2011, Copyright 2011, Association for the Advancement of Artificial Intelligence.

Diettrich, T.G., "T.G., Ensemble Methods in Machine Learning, International Workshop on Multiple Classifier Systems", 2010, Oregon State University, Corvallis, Oregon, U.S.A.

Dumais, S., et al., "Hierarchical Classification of Web Content," In Proc. of SIGIR 2000.

Eisenstein, J., et al., "A Latent Variable Model for Geographic Lexical Variation," Proceedings of the 2010 Conference on Empirical Methods in Natural Language Processing, pp. 1277-1287, MIT, Massachusetts, USA, Oct. 9-11, 2010, Copying 2010 Association for Computational Linguistics.

Fink, C., et al., "Geolocating Blogs from Their Textual Content," Copyright 2008, Association for the Advancement of Artificial Intellience (www.aaai.org).

Hecht, B., et al., "Tweets from Justin Bieber's Heart: The Dynamics of the Location: Field in User Profiles," CHI 2011, May 7-12, 2011, Vancouver, BC, Canada, Copyright 2011 ACM 978-1-4503-0267-8/11/05.

Lampos, V., et al., "Flu Detector—Tracking Epidemics on Twitter," in PRoc. ECML PKDD 2010.

Lieberman, M.D., et al., "You are Where You Edit: Locating Wikipedia Contributors Through Edit Histories," Copyright 2009, Association for the Advancement of Artificial Intelligence (www.aaai.org).

Popescu, A., et al., "Mining User Home Location and Gender from Flickr Tags," Copyright 2010, Association for the Advancement of Artificial Intelligence (www.aaai.org).

Phelan, O., et al., "Using Twitter to Recommend Real-Time Topical News," RecSys'09, Oct. 23-25, 2009, New York, New York USA, Copyright 20009 ACM 978-1-60558-435-5/09/10.

Rokach, Lior, "Ensemble-Based Classifiers," Artif Intell Rev. (2010) 33:1-39; DOI 10.1007/s 10462-009-9124-7.

Sakaki, T., et al., "Earthquake Shakes Twitter Users: Real-Time Event Detection by Social Sensors," in Proc of WWW2010, Apr. 26-30, Raleigh, North Carolina.

Sun, A., et al., "Hierarchical Text Classification and Evaluation," Proceedings of the 2001 IEEE International Conference on Data Mining (ICDM 2001), pp. 521-528, California, USA, Nov. 2001.

Zong, W., et al., "On Assigning Place Names to Geography Related Web Pages," JCDL '05, Jun. 7-11, 2005, Denver, Colorado, USA, Copyright 2005 ACM 1-58113-876-8/05/0006.

Non-Final Office Action dated Jun. 19, 2014 for U.S. Appl. No. 13/593,604.

* cited by examiner

| Term | Location Type | Location Conditional Distribution | Local? |
|---|---|---|---|
| Grass | City | Houston: 0.31<br>Boston: 0.23<br>Fresno: 0.16<br>Tulsa: 0.15<br>Pittsburg: 0.15 | No |
| Vegas | Time Zone | Pacific: 0.8588<br>Eastern: 0.0705<br>Mountain: 0.0470<br>Central: 0.0235 | Yes |

FIG. 4

LOCATION ESTIMATION OF SOCIAL NETWORK USERS

BACKGROUND

The present invention generally relates to location estimation, and more particularly relates to estimating the location of users based on social networking messages.

Recent years have seen a rapid growth in social network services and social network messaging. This has spurred numerous research efforts to mine data from social networking messages for various applications, such as event detection, epidemic dispersion, and news recommendation. These and many other applications can benefit from information about the location of users. However, location data associated with social networking messages is currently very sparse or even non-existent.

BRIEF SUMMARY

In one embodiment a method is disclosed. The method comprises receiving a plurality of social media messages generated by a given user. A plurality of location features is extracted from the social media messages. Each of the location features is processed with at least one classifier from an ensemble of classifiers. A location classification is generated by each of the classifiers for each of the social media messages. Each classification comprises a location and a weight associated with that location. One of the locations is selected from the location classifications as the location of the given user based on a combination of the weights of the location classifications.

In another embodiment a system is disclosed. The system comprises memory and a processor that is communicatively coupled to the memory. A location estimator is communicatively coupled to the memory and the processor. The location estimator is configured to receive a plurality of social media messages generated by a given user. A plurality of location features is extracted from the social media messages. Each of the location features is processed with at least one classifier from an ensemble of classifiers. A location classification is generated by each of the classifiers for each of the social media messages. Each classification comprises a location and a weight associated with that location. One of the locations is selected from the location classifications as the location of the given user based on a combination of the weights of the location classifications.

In yet another embodiment, a computer program product comprising a computer readable storage medium having computer readable program code embodied therewith is disclosed. The computer readable program code comprises computer readable program code configured to receive a plurality of social media messages generated by a given user. A plurality of location features is extracted from the social media messages. Each of the location features is processed with at least one classifier from an ensemble of classifiers. A location classification is generated by each of the classifiers for each of the social media messages. Each classification comprises a location and a weight associated with that location. One of the locations is selected from the location classifications as the location of the given user based on a combination of the weights of the location classifications.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 4 shows local features identified from social network messages according to one embodiment of the present invention;

DETAILED DESCRIPTION

Figure 1:
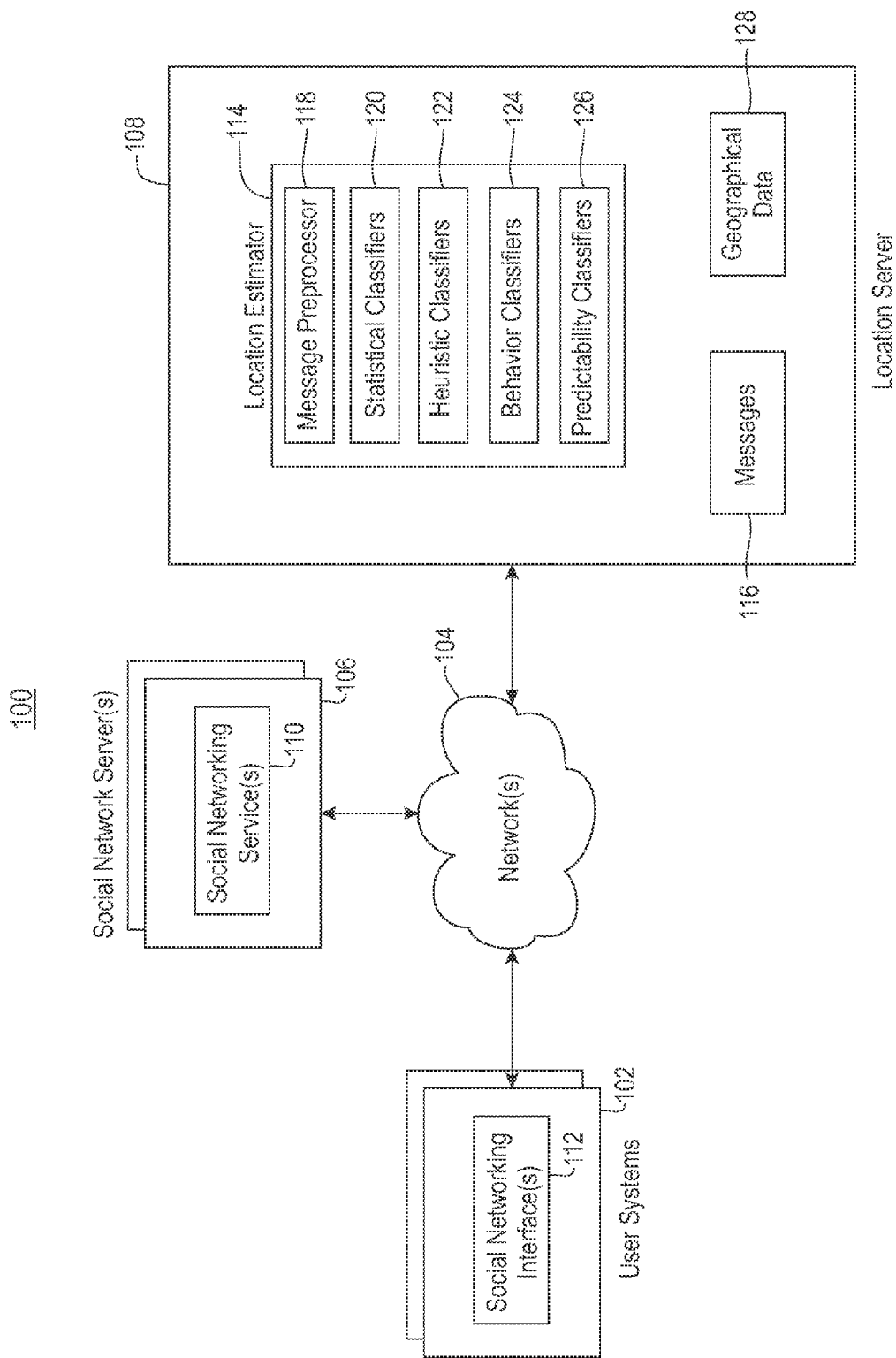
FIG. 1 is a block diagram illustrating an operating environment according to one embodiment of the present invention.

FIG. 1 shows an operating environment 100 applicable to embodiments of the present invention. As shown, one or more user systems 102 are communicatively coupled to one or more networks 104. Examples of user devices 102 are laptop computers, notebook computers, personal computers, tablet computing devices, wireless communication devices, Personal Digital Assistants, gaming units, and the like. The network(s) 104, in this embodiment, is a wide area network, local area network, wired network, wireless network, and/or the like.

One or more social network servers 106 and at least one location server 108 are also communicatively coupled to the network 104. The social network servers 106 provide one or more social networking services (and/or environments) 110 to users of the user devices 102. Examples of a social networking service/environment 110 are a micro-blogging service and a social networking website. Users access the social networking service 110 via an interface 112 such as a web browser or an application programming interface (API). For example, a user is able to submit social networking messages such as micro-blogs and wall posts to the social networking service 106 via the interface 112.

The location server 108 includes a location estimator 114 for estimating the location of users based on their social networking messages 116. In this embodiment, the location estimator 114 estimates or determines the home locations of these users at different granularities (e.g., country, city, state, time zone, and/or geographic region) using the content of their social networking messages and their social network messaging behavior. A user's "home" location refers to the location in which the user lives/resides at one or more granularities (with the terms "home location", "primary location", and "location" being used interchangeably). The location estimator 114 retrieves/receives social networking messages 116 from the social networking service 110. In this embodiment, the location estimator 114 obtains social networking messages 116 using various mechanisms such as an API provided by the social networking service 110 that allows the location estimator 114 to receive streams of social networking messages from the service 110.

The location estimator 114 comprises a message preprocessor 118, one or more statistical classifiers 120, heuristic classifiers 122, behavior-based classifiers 124, and one or more predictability classifiers 126. Various examples of classifiers are Naïve Bayes, Naïve Bayes Multimonial, Sequential Minimal Optimization (SMO) (a Support Vector Machine (SVM) implementation), J48, PART, and Random Forest. The message preprocessor 118 extracts various location features (also referred to as "features" or "terms") from the social networking messages 116 generated by one or more given users and passes these features (terms) to the corresponding classifiers 120, 122, 124, and 126. The statistical, heuristic, and behavior-based classifiers 120, 122, and 124 analyze these features and output a location of the user. In this embodiment, one or more of the statistical classifiers 120 utilize geographical data 128 when performing a location determining process. One example of geographical data is the names of countries, states/territories, cities, counties, and the like. The geographical data 128 is manually entered by human users and/or is obtained from sources such as the United States Geological Survey (USGS) gazetteer. The predictability classifier 126 analyzes the features extracted for a given statistical classifier and the statistical model of a given classifier 120, 122, and 124 to determine whether or not the location of a user can be determined.

In this embodiment, one or more of the statistical classifiers 120, heuristic classifiers 122, and behavior-based classifiers 124 are pre-trained from different features (terms) extracted from a training dataset comprising a test sample of social networking messages. The predictability classifier 126 is pre-trained based on the outputs of the statistical, heuristic, and behavior-based classifiers being correct or incorrect.

Figure 2:
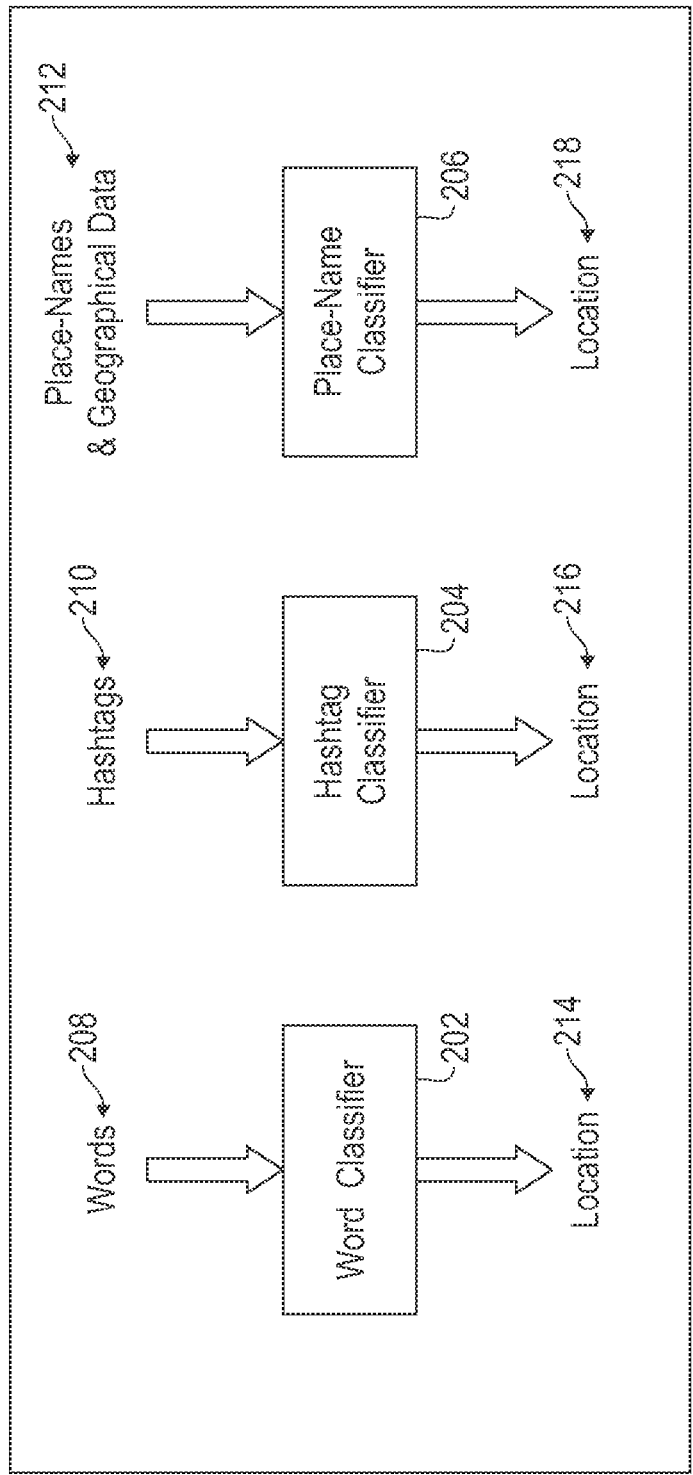
FIG. 2 is a block diagram showing statistical classifiers according to one embodiment of the present invention.

Examples of features that are extracted from social networking messages for the statistical classifiers 120 are words, hashtags (or any other metadata tag), place names (e.g., country, state, county, and city location names), and terms that are local to place names. Therefore, in this embodiment, the statistical classifiers 120 include a classifier 202 pre-trained on word features, a classifier 204 pre-trained on hashtag features, and a classifier 206 pre-trained on place-name features, as shown in FIG. 2. These pre-trained classifiers are also referred to as pre-trained statistical models that each comprise a set of pre-defined features associated with a given number of classes, which is equal to the total number of locations within the training dataset granularity. For example, if the granularity of the training dataset is at the city level, the total number of classes for the statistical classifiers 202, 204, and 206 corresponds to the total number of cities in the training dataset. The location classification process of the location estimator 114 utilizes the statistical models of the statistical classifiers (as well as the pre-trained models of the heuristic and/or behavior-based classifiers) to identify a home location of a user based on the features within the messages 116.

Each message in the training dataset is annotated with a location associated with the user who generated the message. This annotation can be generated based on a location given by the actual user. For example, users participating in the training process can provide their home location as part of the training process. In another example, the annotation can be generated based on a location from which the social networking message originated. In this example, a bounding box is obtained in terms of latitude and longitude for each city using a geo-coding API. Social networking messages are then recorded using the geo-tag filter option of a social networking service's streaming API for each of those bounding boxes until a given number of messages are received from a given number of unique users in each location. The city corresponding to the bounding box where the user was discovered is assumed to be the home location for that user.

During the training process the features of each message in the training dataset are inputted into the appropriate classifiers 202, 204, and 206. The home location of the message is also inputted into the classifiers 202, 204, and 206. Statistical machine learning processes are then performed for each classifier based on these inputs. As a result of this training process, a trained statistical model is generated for use during the location classification process. During training, a statistical model can be generated for each classifier 202, 204, and 206 at each level of granularity. Also, the classifiers 202, 204, and 206 can be continually trained based on classifications performed during the location classification process. While this example of training a classifier applied to the statistical classifiers 120, the example is analogously applicable to training the heuristic and behavior-based classifiers.

Figure 3:
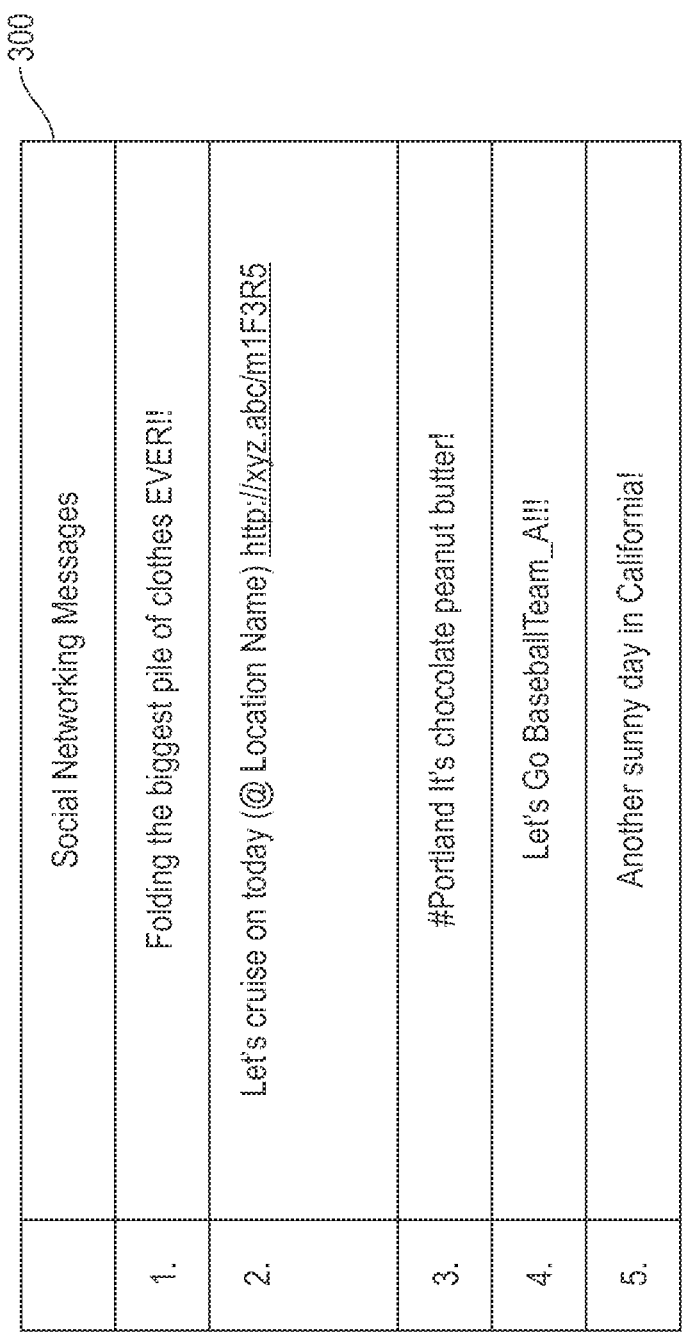
FIG. 3 shows examples of social networking messages according to one embodiment of the present invention.

Once the classifiers have been trained, location classification can be performed. During the location classification process, the location estimator 114 obtains one or more social networking messages 116 associated with one or more given users. FIG. 3 shows exemplary social networking messages 300 obtained by the location estimator 114. The message preprocessor 118 processes the social networking messages 116 to extract various features (terms) that are passed to the classifiers 120, 122, and 124. To extract these features for the statistical classifiers 202, 204, and 206, the message preprocessor 118 performs a tokenization process to generate tokens from the messages 116, while removing punctuation and other whitespace. Any tokens comprising uniform resource locators (URLs) or special characters (e.g., "@", "?", and "!") are then removed. However, tokens comprising URLs from location based services and tokens representing hashtags (or other metadata tags of interest) starting with "#" (e.g., the token #Portland in FIG. 3) are not removed.

Once the tokens have been extracted, various processes are used to extract features specific to each statistical classifier 202, 204, and 206. With respect to the words classifier 202, the message preprocessor 118 extracts all words from tokens that are nouns and non-stop words in this embodiment. The message preprocessor 118 utilizes a parts-of-speech tagging process to identify all words within tokens that are nouns. Adjectives, verbs, prepositions, and the like are not utilized as features for the word classifier 202 of this embodiment because they are often generic and may not discriminate among locations. The message preprocessor 118 also compares words in the tokens to a predefined list of stop words, which are words that are filtered out before or after processing of natural language data (text). Any tokens comprising words matching this list are then removed from the tokens. In this manner, the message preprocessor 118 of this embodiment only extracts words that are nouns and non-stop words.

With respect to the hashtag classifier 204, the message preprocessor 118 identifies/extracts all tokens that start with the # symbol (or any other symbol of interest). With respect to the place names classifier 206, the message preprocessor 118 extracts a set of features that appear in the social networking message 116 and match names of U.S. cities and states from the geographic data 128. Because not all city or state names are a single word, the message preprocessor 118 first generates bi-grams and tri-grams from the tokens (which can be an ordered list). The message preprocessor 118 then compares all uni-grams, bi-grams, and tri-grams to the list of city and state names from the geographic data 128. Any matching names are used as features for the place names classifier 206.

Once the message preprocessor 118 has identified/extracted the set of features for a particular statistical classifier, in this embodiment the message preprocessor 118 identifies which of these features are particularly discriminative (or "local") for a location at the granularity level of interest. For example, the feature "BaseballTeam_A" that is extracted from the fourth social networking messaging in FIG. 3 is local to the city "Boston". The message preprocessor 118 utilizes one or more heuristics to select local feature from the set of features extracted from the messages 116. In this embodiment, the message preprocessor 118 computes the frequency of the selected features for each location and the number of people in that location who have used the feature in their social networking messages. The message preprocessor 118 keeps the features that are present in the messages of at least a threshold percentage of people in that location, where the threshold is an empirically selected parameter (such as 5%). This process also eliminates possible noisy features.

The message preprocessor 118 then computes the average and maximum conditional probabilities of locations for each feature (term), and tests if the difference between these probabilities is above a threshold $T_{diff}$. If this test is successful, the message preprocessor 118 further tests if the maximum conditional probability is above a threshold $T_{max}$. This ensures that the feature has high bias towards a particular location. Applying these heuristics allows the message preprocessor 118 to identify localized features and eliminates many features with uniform distribution across all locations. Non-limiting examples of the above thresholds are $T_{diff}=0.1$ and $T_{max}=0.5$. FIG. 4 shows exemplary features and their conditional distributions. These local features become features that are inputted into the respective statistical classifiers 202, 204, and 206. Therefore, the statistical classifiers 202, 204, and 206 are able to receive local terms, as well as the various features (terms) discussed above.

Each of the extracted features 208, 210, and 212 is then passed to the corresponding statistical classifier 202, 204, and 206, as shown in FIG. 2. Once each statistical classifier 202, 204, and 206 receives the corresponding features 208, 210, and 212 from the message preprocessor 118, each classifier 202, 204, and 206 applies its statistical model to these features and determines the probability of the user's location based thereon. Each classifier then outputs a location classification 214, 216, and 218 comprising the location with the highest probability of being the location of the user. For example, the words classifier 202 outputs a location based on words within a message. The hashtag classifier 204 outputs a location based on the hashtags within a message. The place-name classifier 206 outputs a location based on place names within a message. If local features are used as an input, these classifiers 202, 204, and 206 can also output a location based on the local terms. The outputs 214, 216, and 218 of these classifiers 202, 204, and 206 can be combined to create an ensemble of classifiers that outputs a location of the user based on the combination of outputs 214, 216, and 218 of the individual classifiers 202, 204, and 206.

Figure 5:
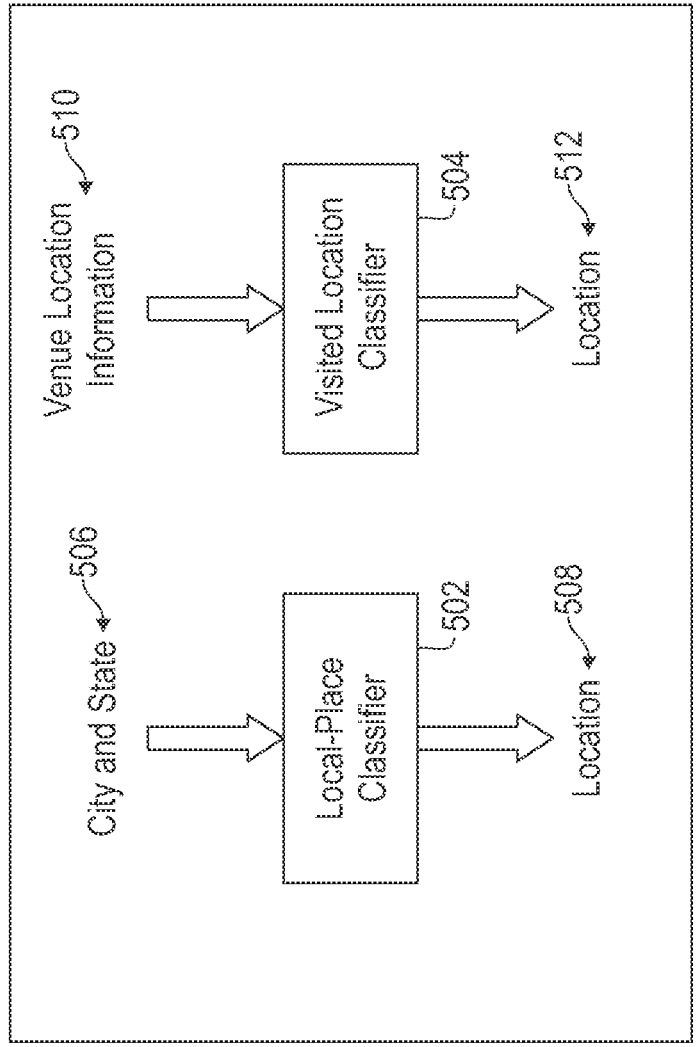
FIG. 5 is a block diagram showing heuristic classifiers according to one embodiment of the present invention.

In addition to the statistical classifiers 202, 204, and 206, the location estimator 114 also utilizes heuristic classifiers 122 that determine/predict users' locations at different granularities. For example, FIG. 5 shows a first heuristic classifier 502. This classifier 502 is a local-heuristic classifier that is specific to classifying city or state-level location. The heuristic utilized by this classifier 502 is that a user would mention their home city and state in social messages such as tweets more often than other cities and states. Therefore, the local-place heuristic classifier 502 receives city and state terms from messages 116 as input and computes the frequency/count of cities and states mentioned in a given number of messages associated with a given user. The local-place heuristic classifier 502 utilizes this count as the matching score of the given user with the given city or state. The local-place heuristic classifier 502 outputs a location classification 508 comprising the city or state with the highest matching score as the location of the given user.

A second heuristic classifier 504 is a visit-history heuristic classifier that is applicable to location classification at all granularities. The heuristic utilized by this classifier 504 is that a user would visit places in his home location more often than places in other locations. In order to retrieve a user's visit history, the message preprocessor searches for URLs generated by a location based service in a given user's messages (e.g., the second social networking message in FIG. 3 contains one such URL). The message preprocessor 118 accesses the content pointed to by the URL and retrieves venue location information (city, state, etc.) associated therewith using one or more APIs associated with the location based service. This venue location information 510 is inputted into the visit-history heuristic classifier 504, which builds a frequency-based statistic for the visited location at the desired level of granularity. The visit-history heuristic classifier 504 outputs a location classification 512 for the user comprising the location with the highest frequency. The outputs of one or more of these heuristic classifiers can be combined together, and also with the outputs of one or more statistical classifiers, to create an ensemble of classifiers, as explained below.

Figure 6:
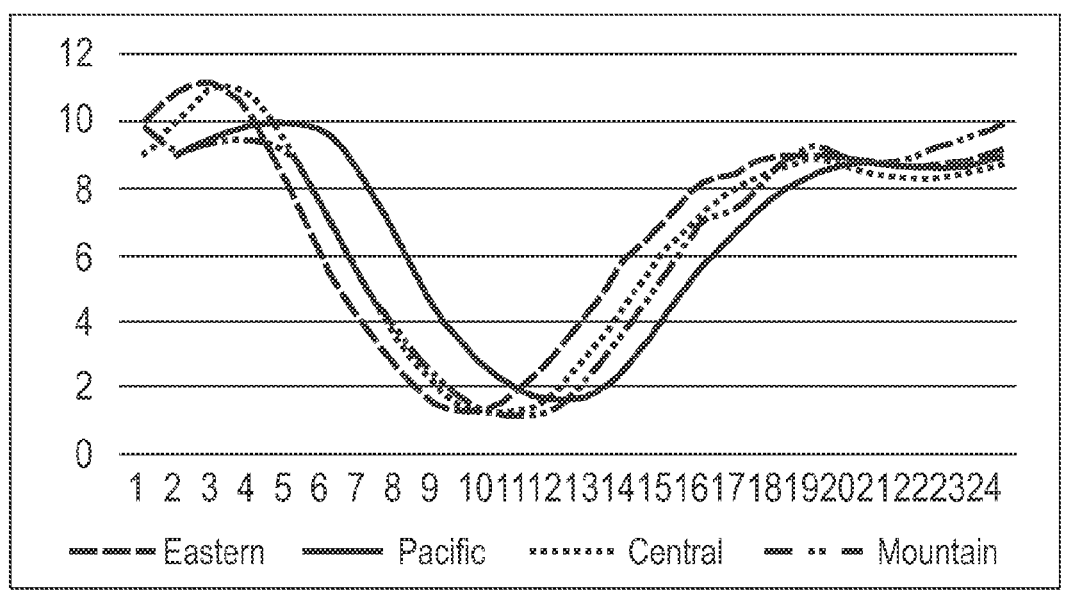
FIG. 6 is a graph illustrating an example of average messaging volume per user for each hour of the day in the four time zones of the United States that is used in one embodiment of the present invention.

The statistical and heuristic classifiers determine the location of a user based on the content of the user's social networking messages 116. In some embodiments, the location of a user is alternatively or additionally determined based on the messaging behavior of the user. The behavior-based classifier 124 determines the location of a user based on the time at which the user sends/generates their social network messages 116. FIG. 6 shows the average messaging volume per user for each hour of the day in the four time zones of the United States (shown in GMT). From this graph 600, the messaging behavior throughout the day has the same shape in each time zone, with a noticeable temporal offset that the classifier 124 is able to leverage to predict the time zone of a user.

Figure 7:
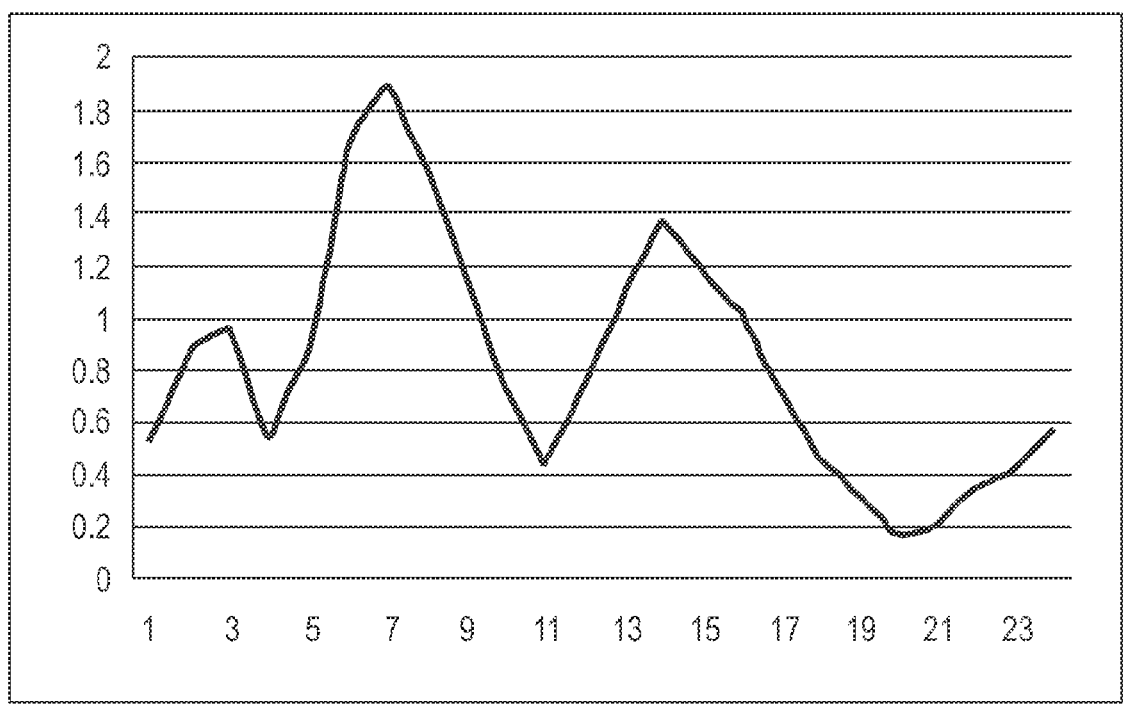
FIG. 7 is a graph illustrating variations of standard deviations of messaging volumes across time zones that is used in one embodiment of the present invention.

The behavior-based classifier 124 is configured by dividing the day into equally-sized time slots of a specified duration. Each time slot represents a feature-dimension for the classifier 124. Time slots for the classifier 124 can be set at any duration and in this example are set at 1-minute durations. For each time slot, the classifier 124 counts the number of messages sent during that time slot for each user in a set of messages 116. Since total messaging frequency in a day varies across users, the number of messages in a time slot for a user is normalized by the total number of messages for that user. FIG. 6 shows that the differences between messaging volumes in different time zones are not uniform throughout the day. The graph 700 in FIG. 7 shows variations of standard deviations of messaging volumes across time zones. These variations mean that different times of day are more discriminative, and this variation is captured by weighting the feature values of each time-slot using the standard deviation for that time slot.

A user's location may not be correctly predictable by a statistical content-based location classifier 120 if the features extracted from user's messages do not have enough overlap with the discriminative features used by the trained model of that classifier. This is also true for the heuristic classifiers 122; a user may not be correctly predictable if mentions of local-place names or visits to locations do not exist or are not discriminative. Therefore, it is advantageous to determine whether a user's location can be determined/predicted by these types of classifiers. Also, an ensemble classifier can improve its accuracy by eliminating classifiers that cannot provide accurate predictions for users whose features are less discriminative (for both statistical and heuristics classifiers) and less overlapping with the trained model (for statistical classifiers).

Therefore, in one embodiment, the location estimator 114 utilizes a predictability classifier 126 in conjunction with each location classifier 120, 122, and 124. Each predictability classifier 126 has a binary output: predictable or not-predictable. If a user is not predictable, the location of that user is not predicted using the corresponding location classifier. Let T denote the set of terms from user's messages that would be considered for classification using a particular classifier. With respect to statistical classifiers 120, the matching location distribution of a term t is the set of locations in a trained model containing that term. If that distribution is not empty, the term is referred to as a matched term. When the matching location distribution is computed for all the terms in T, a cumulative matching location distribution is found for the user. For the local-place classifier 502, this distribution contains locations from the geographical data 128 that match content in the user's messages as well as the frequency of the match. For the visit-history classifier 504, this distribution contains locations from the user's visit history that appear in the geographical data 128 and the frequency of their visits. As an example, consider the following matching location distribution for the statistical word-based classifier 202 for a user at the city granularity: {New York: 20, Los Angeles: 10, Chicago: 5, Dallas: 3, Boston: 6}. Based on this distribution, several metrics are computed to use as features for corresponding predictability classification.

The average classification strength or classification strength for a user is the inverse of the number of matching locations in the matching location distribution. Therefore, the (average) classification strength is $1/5=0.2$ for the above example. The maximum classification strength is the ratio of the maximum location frequency and the total frequency in the matching location distribution. For minimum classification strength, the numerator is the minimum location frequency from the same distribution. Here, the maximum classification strength is $20/44=5/11=0.4545$ and the minimum classification strength is $3/44=0.068$. These three classification strength metrics are used as features for all predictability classifiers.

The overlap strength of a user is the ratio of the number of matched features (terms) to the total number of features. For example, if a user has 100 words identified from social messages (e.g., tweets) and 50 of them have a non-empty matching location distribution, then the overlap strength for the word-based predictability classification will be 1/2. In one embodiment, this feature is only used to train predictability classifiers 126 for the statistical content-based classifiers 120. To construct the labeled data for a predictability classifier 126, the corresponding location classifier is used. For each user, the location classification is generated using that location classifier and the predictability class label is set based on whether or not that classification is correct.

Figure 8:
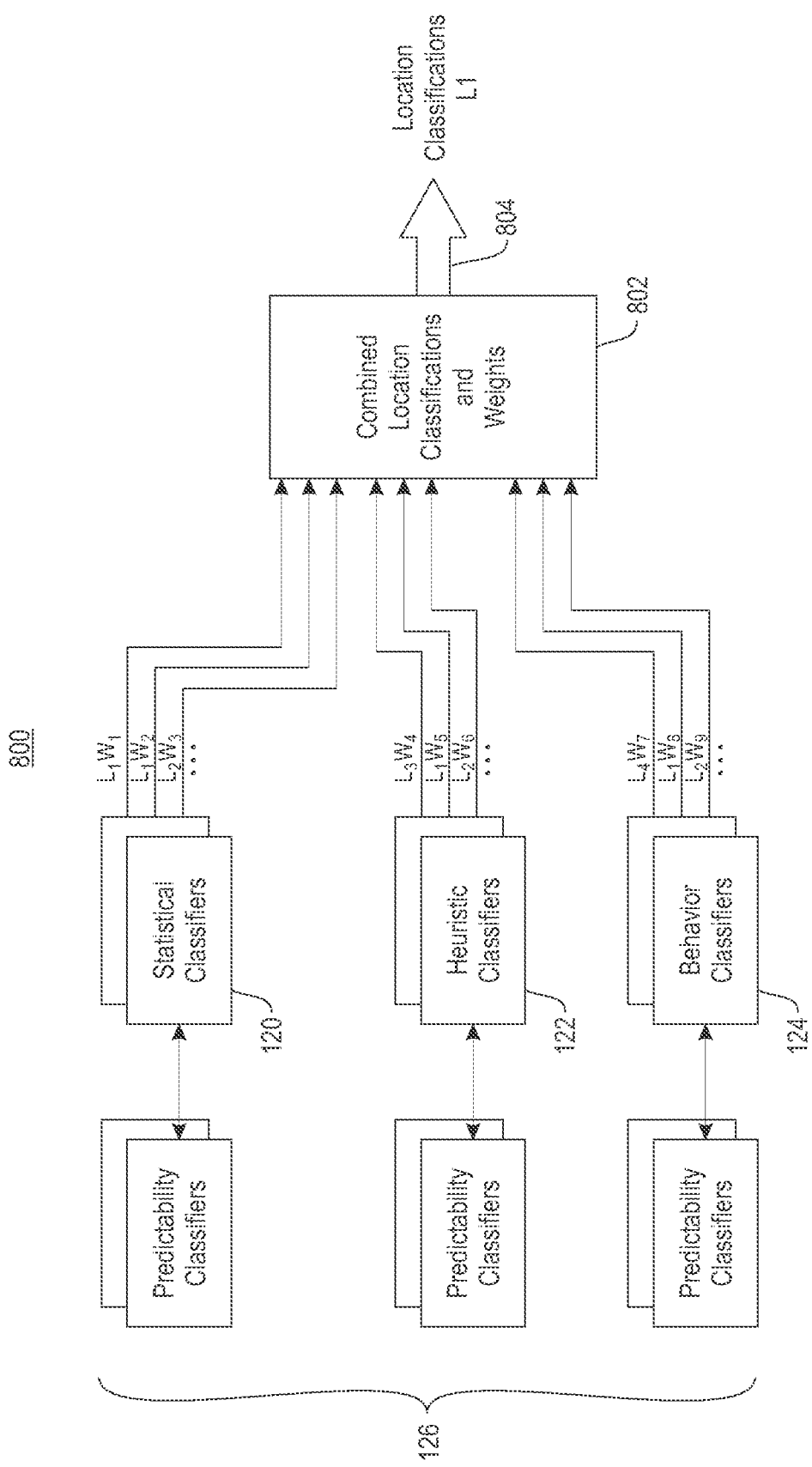
FIG. 8 is a block diagram illustrating an ensemble of classifiers according to one embodiment of the present invention.

In one embodiment, the individual classifiers 120, 122, and 124 are combined together to form an ensemble of location classifiers 800, as shown in FIG. 8. In this embodiment, the ensemble of classifiers is a weighted linear ensemble of location classifiers. Let $\{C_1, C_2, \ldots, C_n\}$ be the set of classifiers and $Y_1(x_i), Y_2(x_i), \ldots Y_n(x_i)$ be the classification produced by each of them, where the input data is $x_i$ and $Y_j(x_i)$ corresponds to the location predicted by jth classifier. In the simplest ensemble approach of bagging, each classifier receives an equal weight. More complex approaches such as boosting can also be used. In boosting, weights are automatically learned based on performance. In this embodiment, the classifiers are heuristically weighted according to their discriminative abilities as determined by the classification strength for classifying that instance. The location with the highest rank by weighted linear combination is returned as the result, as shown in FIG. 8.

FIG. 8 shows that each of the statistical classifiers 120, heuristic classifiers 122, and behavior classifiers 124 outputs multiple location classifications. If a predictability classifier 126 determines that a user's location cannot be predicted by one of the classifiers 120, 122, and 124, the predictability classifier 126 prevents this classifier from generating a location classification for one or more messages associated with the user. The location classifications generated by the classifiers 120, 122, and 124 comprise a location associated with a weight. In the example of FIG. 8, the statistical classifiers 120 have generated a location classification $L_1$ with weight $W_1$, another location classification $L_1$ with weight $W_2$, and a location classification $L_2$ with weight $W_3$. These location classifications can be generated by a single statistical classifier or by multiple statistical classifiers. The heuristic classifiers 122 have generated a location classification $L_3$ with weight $W_4$, another location classification $L_1$ with weight $W_5$, and another location classification $L_2$ with weight $W_6$. These location classifications can be generated by a single heuristic classifier or by multiple heuristic classifiers. The behavior classifiers have generated a location classification $L_4$ with weight $W_7$, another location classification $L_1$ with weight $W_8$, and a yet another location classification $L_1$ with weight $W_9$. These location classifications can be generated by a single behavior classifier or by multiple behavior classifiers.

The weights of the location classifications corresponding to the same location are combined 802. For example, the weights for location classification $L_1$ are combined; the weights for location classification $L_2$ are combined; the weights for location classification $L_3$ are combined; and the weights for location classification $L_4$ are combined. The location classification 804 comprising the highest weight (or lowest depending on the weighting and/or ranking mechanism) is then outputted as the location classification for the user.

In some embodiments the weighting heuristic utilizing classification strength is not used for the behavior-based classifier 124. In these embodiments, the following ensemble approach can be utilized. Let $TC_1$ be the content based time zone classification and $W_1$ be the normalized value of the weight associated with it, where $W_1$ is computed as a ratio of the weight associated with classification $TC_1$ (sum of classification strengths for $TC_1$) and the total value of classification strengths associated with content-based classifications. Let $TC_2$ be the classification produced by the tweet-behavior classifier and $W_2$ be the weight associated with the classification $TC_2$, where $W_2$ is either the probability value or the confidence value associated with the classification $TC_2$. The classification with higher weight is returned as the final classification.

For location classification at a smaller granularity (such as city level), classifiers discriminate among many locations to generate a location classification. In one embodiment, this task is simplified by taking a large classification problem and dividing it up into multiple smaller classification problems in which the classifiers 120, 122, 124, and 126 are organized in a hierarchy. The initial classifier in such a system generates a high-level classification (such as for time zone), and lower level classifiers are trained for each of the classes of the high-level classifier. The low-level classifier that is used for a particular instance is determined by the classification of the initial classifier.

In this embodiment, a location is determined utilizing a two level hierarchy in which the time zone is the first level of hierarchy. The location estimator 114 classifies between only certain time zones (such as Eastern, Central, Mountain, and Pacific). An ensemble time-zone classifier is trained using all content-based classifiers and the behavior-based classifier. In this embodiment, city classifiers are trained for each time zone, with each classifier determining/predicting only the cities in its time zone and only being trained with examples from that time zone.

Figure 9:
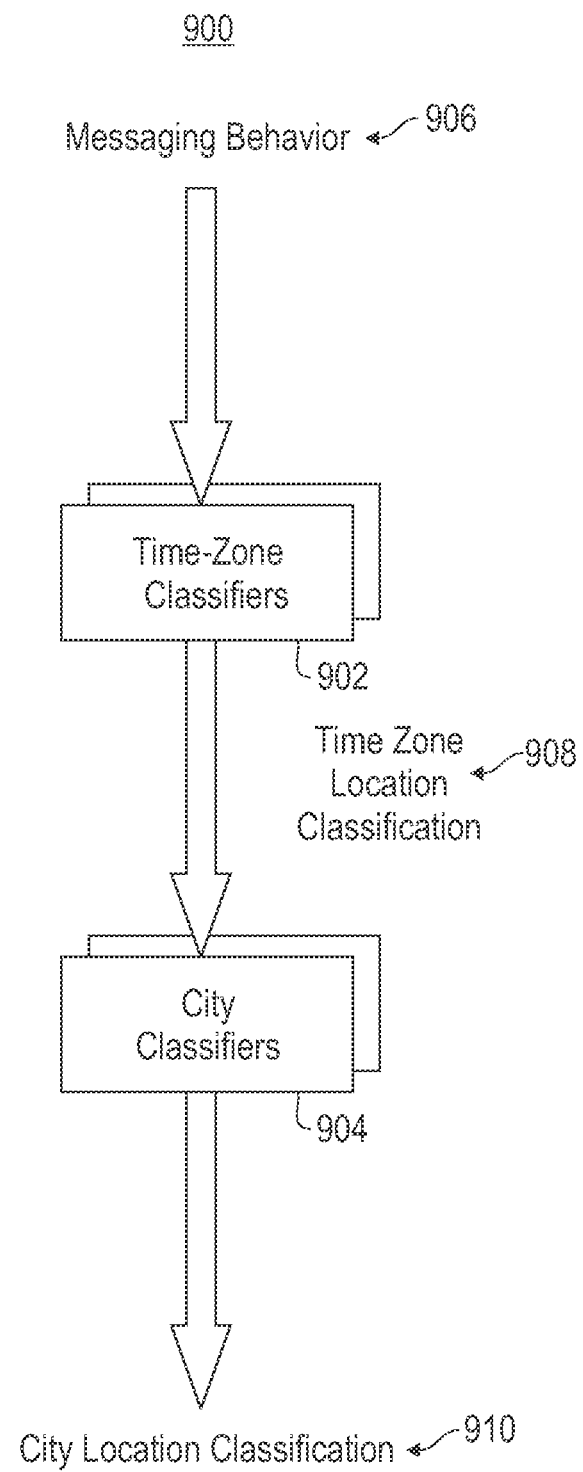
FIG. 9 is a block diagram illustrating a hierarchical ensemble of classifiers according to one embodiment of the present invention.

FIG. 9 shows an exemplary hierarchical ensemble classifier 900. In this example, the first (or top) level comprises a time-zone classifier 902 such as the behavior-based classifiers 124. Predictability classifiers are also utilized in some embodiments. The second (or lower) level comprises a city classifier 904 such as the statistical and/or heuristic classifiers 122 and 124 (a hierarchical ensemble classifier is not limited to only two levels, additional levels for additional granularities can be included). The time-zone classifier 902 receives messaging behavior features 906 from the messaging preprocessor 118 as input. In further embodiments, other features that allow for time-zone location to be determined are used as input. The time-zone classifier 902 processes these features and generates a time-zone location classification 908. If multiple time-zone location classifications are being determined by the time-zone classifier 902, the classification with the highest probability/weight is selected. The city classifier 904 processes the time-zone location classification 908 and generates a city location classification 908. If multiple city location classifications are being determined by the time-zone classifier 902, the classification with the highest probability/weight is selected as the location of the user.

In a state-hierarchy configuration, states/territories are used as the first level of the hierarchy. The ensemble state classifier includes content-based classifiers, and city classifiers are built for all states. In a region hierarchy configuration, geographical regions are utilized as the first level of hierarchy (such as Northeast, Midwest, South, and West), and the regional hierarchical classifiers are built using the same basic approach as for the state hierarchical classifiers.

Accordingly, embodiments of the present invention infer the home locations of social network users at different granularities (such as city, state, time zone, or geographic region) using the content of their social networking messages and/or messaging behavior. Some embodiments utilize an ensemble of statistical and heuristic classifiers to determine/predict locations. Some embodiments utilize a hierarchical classification approach for improving prediction accuracy (such as by predicting time zone, state, or geographic regions first, and then predicting city next). A "predictability" classifier is utilized in some embodiments to determine whether enough information is available for a given user to predict the home location.

Figure 10:
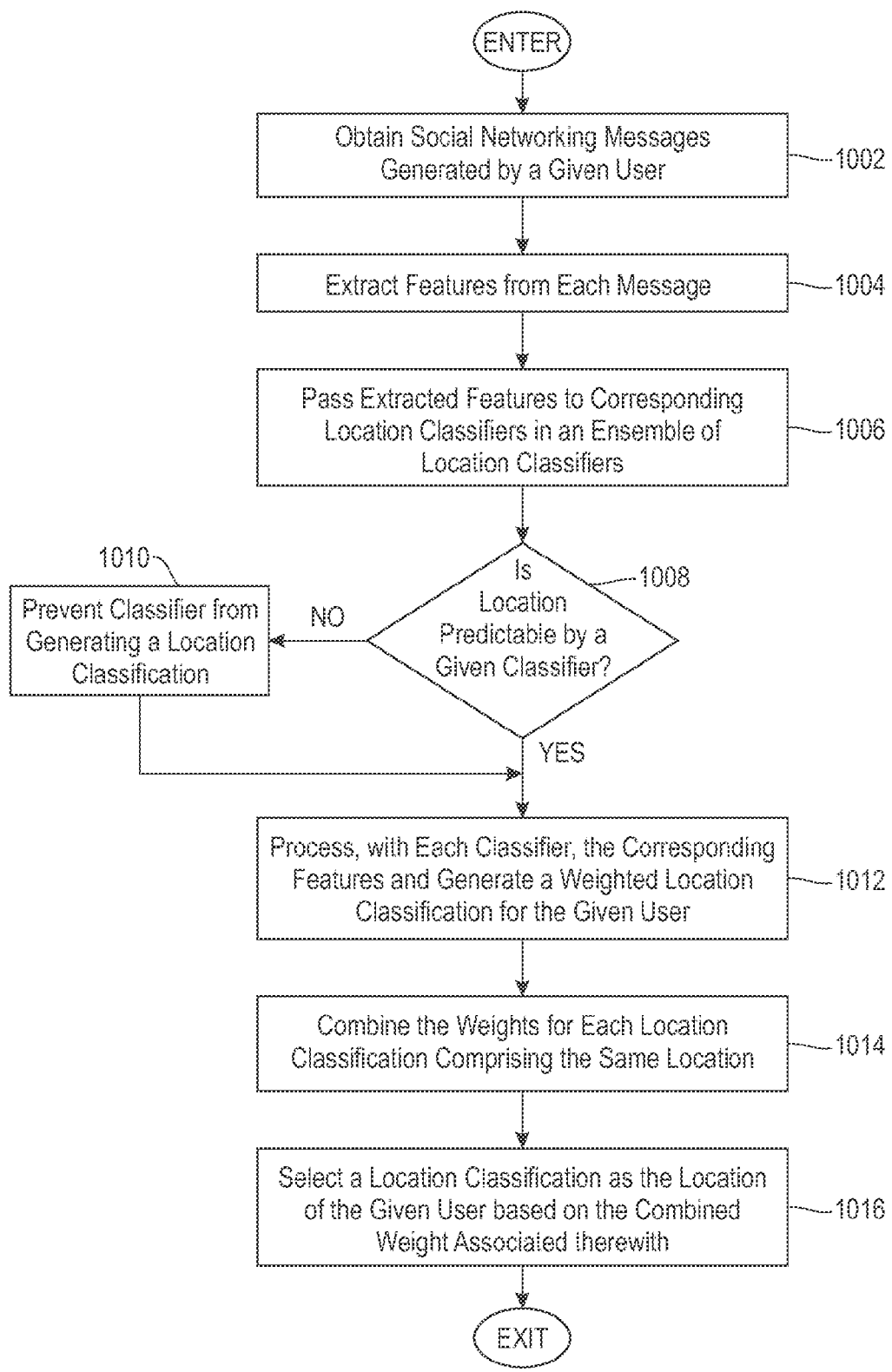
FIG. 10 is an operational flow diagram illustrating a process for determining the location of social network users according to one embodiment of the present invention.

FIG. 10 is an operational flow diagram illustrating a process for determining the location of a social network user according to one embodiment of the present invention. The location estimator 114 obtains social networking messages 116 generated by a given user, at step 1002. The location estimator 114 extracts location features from each message 116, at step 1004. The location estimator 114 passes the extracted features to corresponding classifiers 120, 122, and 124 within an ensemble of classifiers 800/900, at step 1006.

A predictability classifier 126 associated with each of the ensemble of classifiers 800/900 determines if the location of the given user is predictable by a given classifier, at step 1008. If the result of this determination is negative, the location estimator 114 prevents this classifier(s) from generating a location classification for the given user, at step 1010. This location estimator 114 can be prevented from generating a location classification for all messages associated with the given user or a subset of the messages. If the result of this determination is positive, each classifier processes the corresponding features and generates a weighted location classification for the given user, at step 1012. The location estimator 114 combines the weights for each location classification comprising the same location, at step 1014. The location estimator 114 selects a location classification as the location of the given user based on the combined weight associated therewith. The control flow then exits. A similar process is performed for a hierarchical ensemble of classifiers or for single classifiers.

Figure 11:
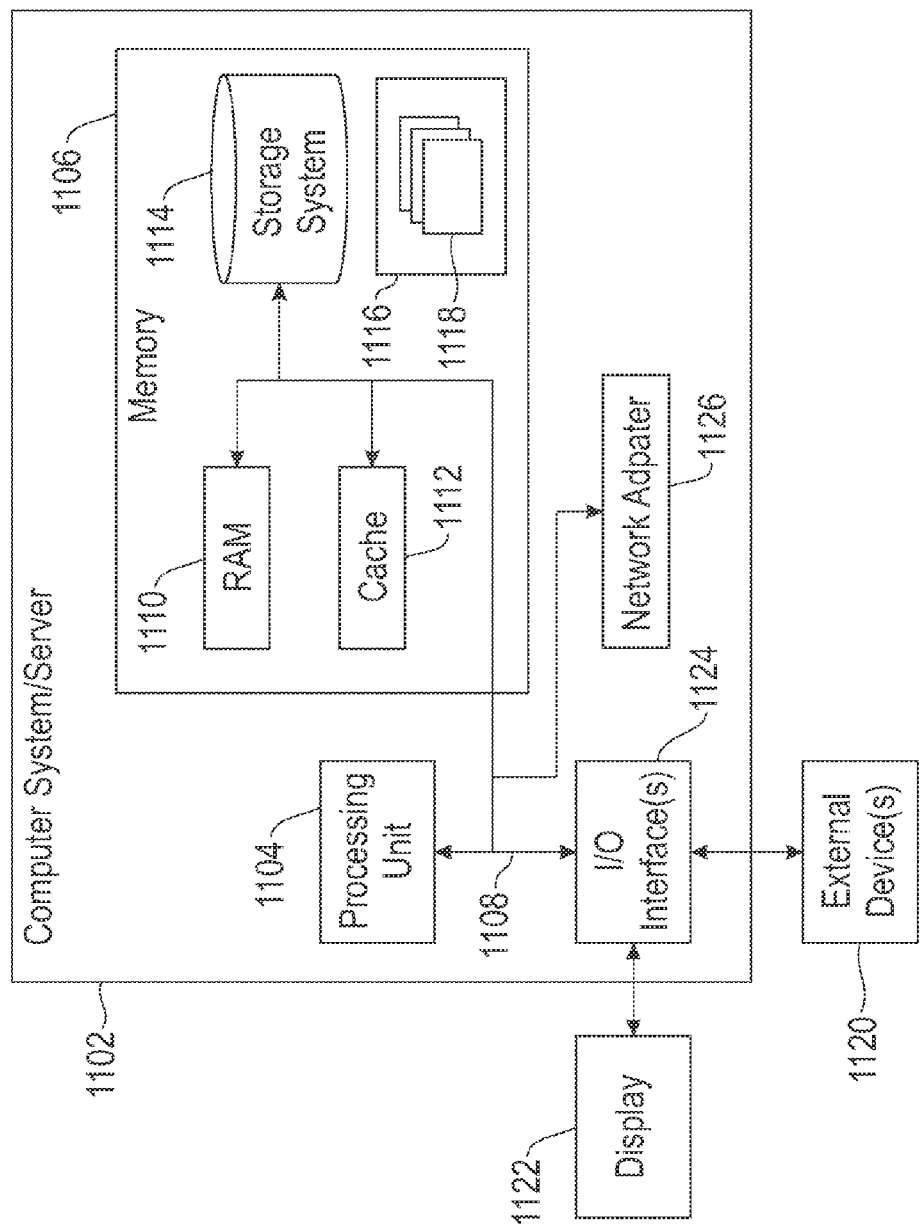
FIG. 11 is a block diagram illustrating an information processing system that can be utilized in embodiments of the present invention.

FIG. 11 is a block diagram illustrating an information processing system that can be utilized in embodiments of the present invention. The information processing system 1100 is based upon a suitably configured processing system adapted to implement one or more embodiments of the present invention (e.g., the user system 102 and/or the server system 106 of FIG. 1). Any suitably configured processing system can be used as the information processing system 1100 in embodiments of the present invention.

The information processing system 1100 includes a computer 1102. The computer 1102 has a processor(s) 1104 that is connected to a main memory 1106, mass storage interface 1108, and network adapter hardware 1110. A system bus 1112 interconnects these system components. Although only one CPU 1104 is illustrated for computer 1102, computer systems with multiple CPUs can be used equally effectively. Although not shown in FIG. 11, the main memory 1106 includes the location estimator 114 and its components, as well as, the social networking messages and geographic data 128. In another embodiment, the location estimator 114 can reside within the processor 1104, or be a separate hardware component.

The mass storage interface 1108 is used to connect mass storage devices, such as mass storage device 1114, to the information processing system 1100. One specific type of data storage device is an optical drive such as a CD/DVD drive, which can be used to store data to and read data from a computer readable medium or storage product such as (but not limited to) a CD/DVD 1116. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 1100. The network adapter hardware 1110 is used to provide an interface to a network 104. Embodiments of the present invention are able to be adapted to work with any data communications connections including present day analog and/or digital techniques or via a future networking mechanism.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A system comprising:
a memory;
a processor communicatively coupled to the memory;
a location estimator communicatively coupled to the memory and the processor, wherein the test location estimator is configured to:
receive a plurality of social media messages generated by a given user; extract a plurality of location features from the social media messages;
compute, for each of the plurality of location features, a frequency of the location feature for at least one location;
determine, for each of the plurality of location features, a number of people in the at least one location who have used the location feature in their social networking messages;
determine, for each of the plurality of location features and based on the computed frequency and the determined number of people, if the location feature was included within social networking messages of a threshold percentage of people in the at least on location;
based on the location feature having been included within social networking messages of the threshold percentage of people;
adding the feature to the subset of features;
identify at least a subset of location features from the plurality of location features that are discriminative of at least one location at a location granularity level of interest;
process each of the subset of location features with at least one classifier from an ensemble of classifiers;
generate, by each of the classifiers, a location classification for each of the social media messages, each location classification comprising a location and a weight associated with that location; and
select one of the locations from the location classifications as the location of the given user based on a combination of the weights of the location classifications.

2. The system of claim 1,
wherein the ensemble of classifiers is a hierarchical ensemble of classifiers, and each classifier in a given level of the hierarchical ensemble of classifiers identifies a location at a smaller granularity than each classifier in a higher level of the hierarchical ensemble of classifiers.

3. The system of claim 2, wherein the location estimator is configure to generate a location classification by:
identifying, by each classifier at a first level of the hierarchical ensemble of classifiers, a time-zone location for the given user; and
identifying, by each classifier at a second level of the hierarchical ensemble of classifiers that is below the first level, a city location for the given user based partially on the time-zone location identified in the first level.

4. The system of claim 2, wherein the location estimator is configure to generate a location classification by:
identifying, by each classifier at a first level of the hierarchical ensemble of classifiers, a state location for the given user; and
identifying, by each classifier at a second level of the hierarchical ensemble of classifiers that is below the first level, a city location for the given user based partially on the state location identified in the first level.

5. The system of claim 2, wherein the location estimator is configure to generate a location classification by:
identifying, by each classifier at a first level of the hierarchical ensemble of classifiers, a geographical region location associated with the given user; and
identifying, by each classifier at a second level of the hierarchical ensemble of classifiers that is below the first level, a city location for the given user based partially on the geographical region location identified in the first level.

6. The system of claim 1, wherein the location estimator is configure to process by:
determining, by a binary classifier associated with one of the classifiers in the ensemble of classifiers, if a location associated with a given user is predictable by the one classifier; and
preventing the one classifier from generating the location classification if the binary classifier determines that the location is not predictable by the one classifier.

7. A computer program product comprising:
a non-transitory computer readable storage medium having computer readable program code embodied therewith, the computer readable program code configured to:
receive a plurality of social media messages generated by a given user; extract a plurality of location features from the social media messages;
process each of the location features with at least one classifier from an ensemble of classifiers, wherein processing each of the location features comprises determining, by a binary classifier associated with one of the classifiers in the ensemble of classifiers, if a location associated with a given user is predictable by the on classifier; and
preventing the one classifier from generating the location classification if the binary classifier determines that the location is not predictable by the one classifier;
generate, by each of the classifiers, a location classification for each of the social media messages, each location classification comprising a location and a weight associated with that location; and
select one of the locations from the location classifications as the location of the given user based on a combination of the weights of the location classifications.

8. The computer program product of claim 7,
wherein the ensemble of classifiers is a hierarchical ensemble of classifiers, and each classifier in a given level of the hierarchical ensemble of classifiers identifies a location at a smaller granularity than each classifier in a higher level of the hierarchical ensemble of classifiers.

9. The computer program product of claim 8, wherein the computer readable program code is configured to generate a location classification by:
identifying, by each classifier at a first level of the hierarchical ensemble of classifiers, a time-zone location for the given user; and identifying, by each classifier at a second level of the hierarchical ensemble of classifiers that is below the first level, a city location for the given user based partially on the time-zone location identified in the first level.

10. The computer program product of claim 8, wherein the computer readable program code is configured to generate a location classification by:

identifying, by each classifier at a first level of the hierarchical ensemble of classifiers, a state location for the given user; and identifying, by each classifier at a second level of the hierarchical ensemble of classifiers that is below the first level, a city location for the given user based partially on the state location identified in the first level.

11. The computer program product of claim 8, wherein the computer readable program code is configured to generate a location classification by:

identifying, by each classifier at a first level of the hierarchical ensemble of classifiers, a geographical region location associated with the given user; and identifying, by each classifier at a second level of the hierarchical ensemble of classifiers that is below the first level, a city location for the given user based partially on the geographical region location identified in the first level.

12. The computer program product of claim 7, wherein the computer readable program code is configured to processing by:

processing a subset of the location features with at least one behavior-based classifier, the subset of location features comprising a frequency of social media messages generated by the given user for a plurality of time durations.

* * * * *